(12) United States Patent
Khlat et al.

(10) Patent No.: US 9,654,151 B2
(45) Date of Patent: May 16, 2017

(54) RADIO FREQUENCY FRONT END CIRCUITRY WITH IMPROVED PRIMARY TRANSMIT SIGNAL ISOLATION

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/083,791

(22) Filed: Mar. 29, 2016

(65) Prior Publication Data

US 2016/0336972 A1 Nov. 17, 2016

Related U.S. Application Data

(60) Provisional application No. 62/159,702, filed on May 11, 2015.

(51) Int. Cl.
| | |
|---|---|
| *H04B 1/00* | (2006.01) |
| *H04B 1/3805* | (2015.01) |
| *H04B 1/48* | (2006.01) |
| *H04B 7/06* | (2006.01) |
| *H04B 7/08* | (2006.01) |

(52) U.S. Cl.
CPC ........... *H04B 1/006* (2013.01); *H04B 1/3805* (2013.01); *H04B 1/48* (2013.01); *H04B 7/0602* (2013.01); *H04B 7/0805* (2013.01)

(58) Field of Classification Search
CPC ...... H04B 1/126; H04B 7/024; H04B 7/0404; H04B 7/0602; H04B 7/0805

USPC ............................... 455/82, 83, 562.1, 575.7
See application file for complete search history.

(56) References Cited

U.S. PATENT DOCUMENTS

| | | | | |
|---|---|---|---|---|
| 5,471,146 A | * | 11/1995 | Krayeski | H04B 17/318 324/637 |
| 5,822,684 A | * | 10/1998 | Kitakubo | H01P 1/15 333/103 |
| 6,507,728 B1 | * | 1/2003 | Watanabe | H04B 1/126 455/126 |
| 7,671,720 B1 | * | 3/2010 | Martin | G06K 19/0723 340/10.1 |
| 2006/0240769 A1 | * | 10/2006 | Proctor, Jr. | H04B 7/15585 455/24 |
| 2010/0278085 A1 | * | 11/2010 | Hahn | H04B 1/525 370/286 |
| 2011/0237207 A1 | | 9/2011 | Bauder | |

* cited by examiner

*Primary Examiner* — Wen Huang
(74) *Attorney, Agent, or Firm* — Withrow & Terranova, P.L.L.C.

(57) ABSTRACT

RF front end circuitry includes primary transceiver circuitry associated with a primary antenna and secondary receiver circuitry associated with a secondary antenna. Generally, the primary transceiver circuitry and the primary antenna are located on one end of a mobile communications device, while the secondary receiver circuitry and the secondary antenna are located at an opposite end of the device. Cross-coupling connection lines run between the antenna switching circuitry for the primary antenna and the secondary antenna, and are reused to send a portion of primary RF transmit signals from the primary transceiver circuitry to the secondary receiver circuitry so that primary RF transmit signals coupled into the secondary receiver path via antenna-to-antenna coupling can be reduced.

20 Claims, 10 Drawing Sheets

RADIO FREQUENCY FRONT END CIRCUITRY WITH IMPROVED PRIMARY TRANSMIT SIGNAL ISOLATION

RELATED APPLICATIONS

This application claims the benefit of U.S. provisional patent application No. 62/159,702, filed May 11, 2015, the disclosure of which is incorporated herein by reference in its entirety.

FIELD OF THE DISCLOSURE

The present disclosure relates to radio frequency (RF) front end circuitry, and specifically to RF front end circuitry configured to improve primary RF transmit signal isolation in a secondary receiver signal path.

BACKGROUND

Figure 1:
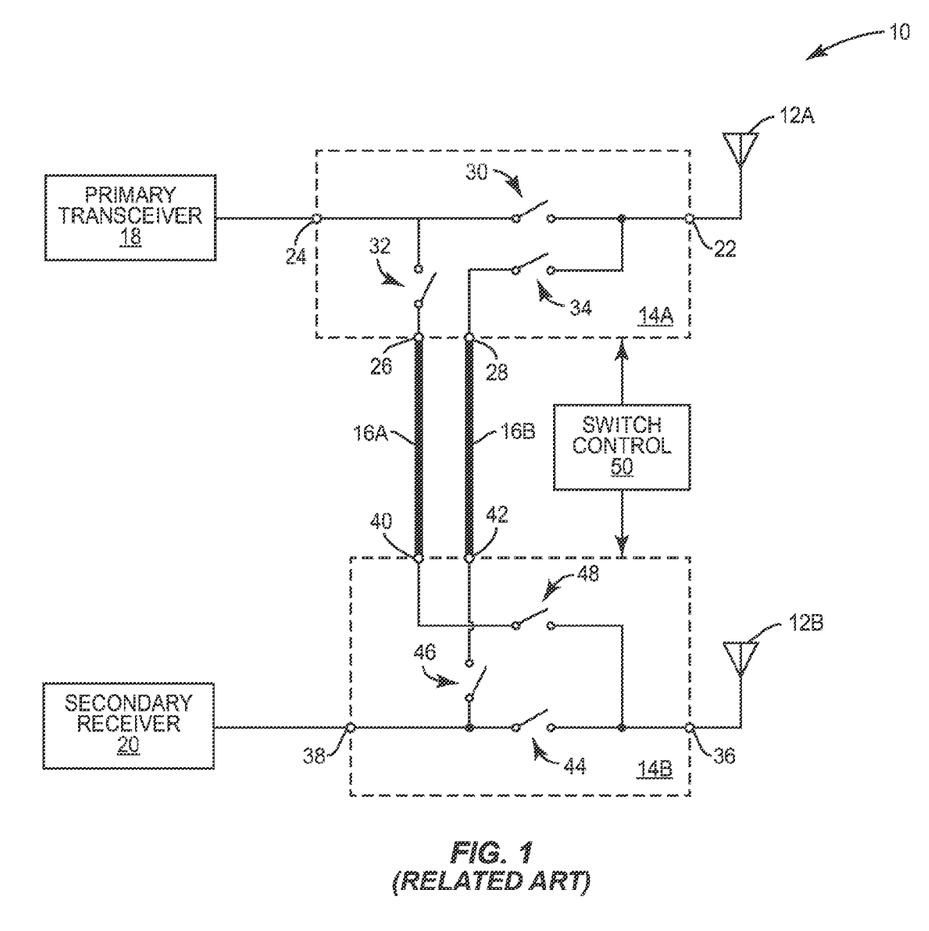
FIG. 1 is a schematic representation of conventional RF front end circuitry.

Advances in radio frequency (RF) front end circuitry continue to provide improvements in signal quality and data throughput. One technique for improving signal quality and data throughput is by providing multiple antennas, which are used to simultaneously transmit and/or receive signals. FIG. 1 shows conventional RF front end circuitry 10 including a primary antenna 12A, a secondary antenna 12B, primary antenna switching circuitry 14A coupled to the primary antenna 12A, secondary antenna switching circuitry 14B coupled to the secondary antenna 12B, a first cross-coupling connection line 16A and a second cross-coupling line 16B coupled between the primary antenna switching circuitry 14A and the secondary antenna switching circuitry 14B, primary transceiver circuitry 18 coupled to the primary antenna switching circuitry 14A, and secondary receiver circuitry 20 coupled to the secondary antenna switching circuitry 14B.

The primary antenna switching circuitry 14A includes a primary antenna node 22, a primary transceiver node 24, a first cross-coupling connection node 26, and a second cross-coupling connection node 28. A first switch 30 is coupled between the primary antenna node 22 and the primary transceiver node 24. A second switch 32 is coupled between the primary transceiver node 24 and the first cross-coupling connection node 26. A third switch 34 is coupled between the primary antenna node 22 and the second cross-coupling connection node 28. The secondary antenna switching circuitry 14B includes a secondary antenna node 36, a secondary receiver node 38, a third cross-coupling connection node 40, and a fourth cross-coupling connection node 42. A fourth switch 44 is coupled between the secondary antenna node 36 and the secondary receiver node 38. A fifth switch 46 is coupled between the secondary receiver node 38 and the third cross-coupling connection node 40. A sixth switch 48 is coupled between the secondary antenna node 36 and the fourth cross-coupling connection node 42. The first cross-coupling connection line 16A is coupled between the first cross-coupling connection node 26 and the third cross-coupling connection node 40. The second cross-coupling connection line 16B is coupled between the second cross-coupling connection node 28 and the fourth cross-coupling connection line 42.

Figure 2A:
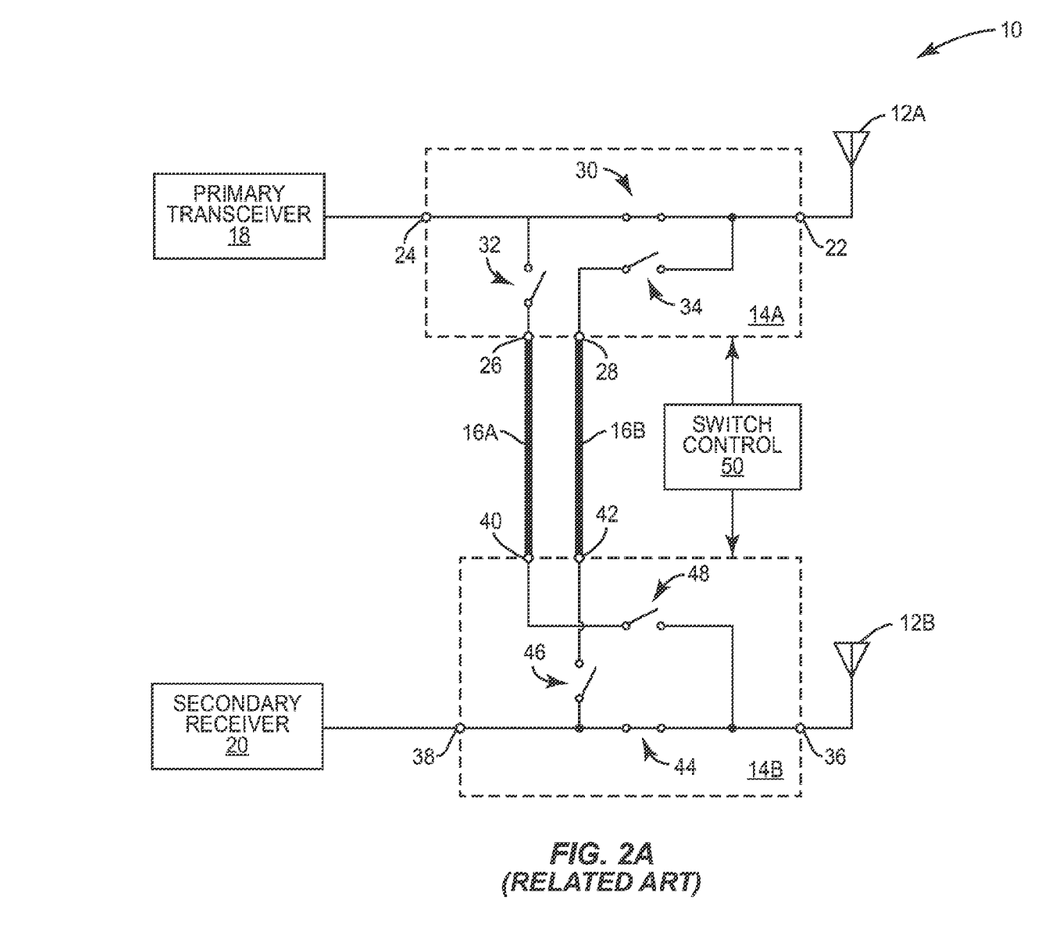
FIGS. 2A and 2B are schematic representations of conventional RF front end circuitry.

In a first mode of operation, the first switch 30 and the fourth switch 44 are closed, while the second switch 32, the third switch 34, the fifth switch 46, and the sixth switch 48 are open, thereby coupling the primary transceiver circuitry 18 to the primary antenna 12A and the secondary receiver circuitry 20 to the secondary antenna 12B. This configuration is illustrated in FIG. 2A. Accordingly, in the first mode of operation, primary RF transmit signals are provided from the primary transceiver circuitry 18 to the primary antenna 12A, primary RF receive signals are provided from the primary antenna 12A to the primary transceiver circuitry 18, and secondary RF receive signals are provided from the second antenna 12B to the secondary receiver circuitry 20. The secondary RF receive signals may be diversity multiple-input-multiple-output (MIMO) receive signals. In general, the first mode of operation is used when the performance of the primary antenna 12A is better than that of the secondary antenna 12B, for example, when the voltage standing wave ratio (VSWR) associated with the primary antenna 12A is lower than the VSWR associated with the secondary antenna 12B.

Figure 2B:
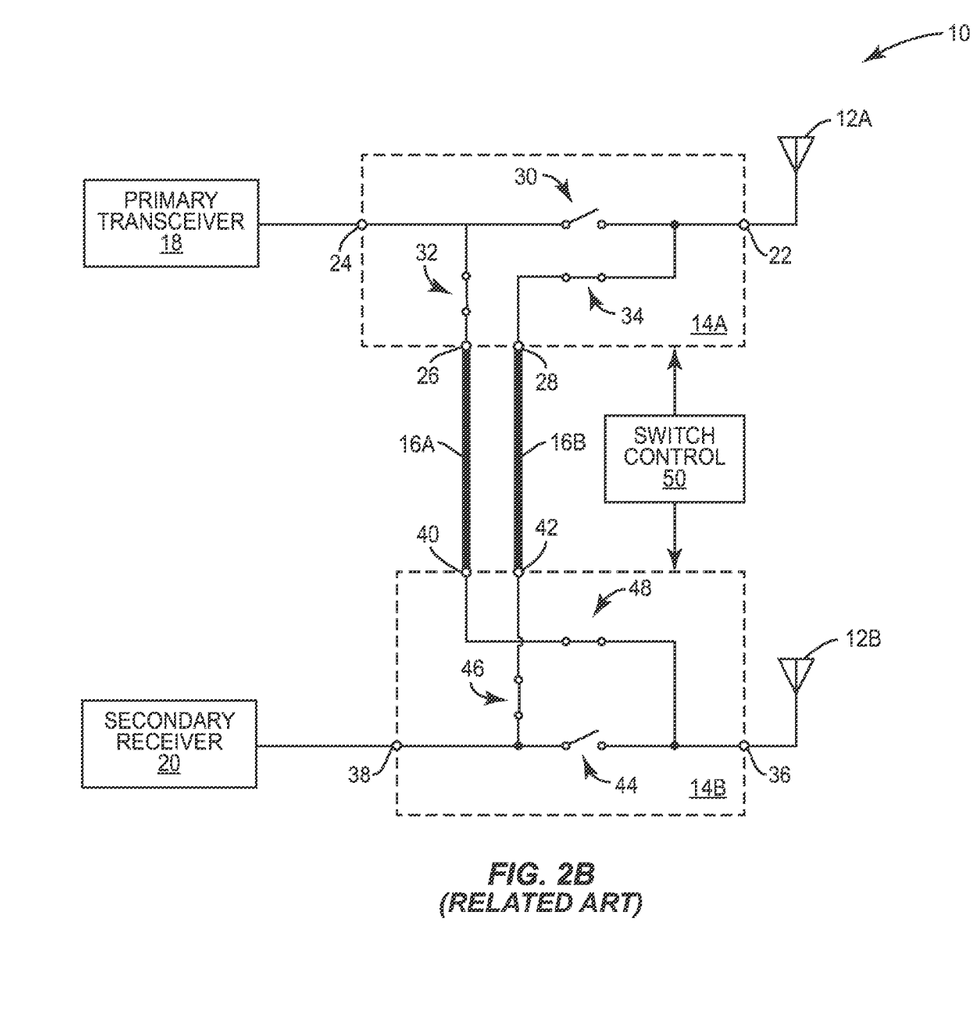

In a second mode of operation, the second switch 32, the third switch 34, the fifth switch 46, and the sixth switch 48 are closed, while the first switch 30 and the fourth switch 44 are open, thereby coupling the primary transceiver 18 to the secondary antenna 12B and the secondary receiver circuitry 20 to the primary antenna 12A. This configuration is illustrated in FIG. 2B. Specifically, the primary transceiver circuitry 18 is coupled to the secondary antenna 12B via the first cross-coupling connection line 16A, while the secondary receiver circuitry 20 is coupled to the primary antenna 12A via the second cross-coupling connection line 16B. Accordingly, in the second mode of operation, primary RF transmit signals are provided from the primary transceiver circuitry 18 to the secondary antenna 12B, primary RF receive signals are provided from the secondary antenna 12B to the primary transceiver circuitry 18, and secondary RF receive signals are provided from the primary antenna 12A to the secondary receiver circuitry 20. In general, the second mode of operation is used when the performance of the primary antenna 12A is worse than that of the secondary antenna 12B, for example, when the VSWR associated with the primary antenna 12A is higher than the VSWR associated with the secondary antenna 12B. Those skilled in the art will appreciate that the antenna swapping capability enabled by the conventional RF front end circuitry 10 allows the antenna with the best performance to be used for the primary transmission and reception of RF signals, which generally improves the signal quality of primary RF signals. Switch control circuitry 50 coupled to the first antenna switching circuitry 14A and the second antenna switching circuitry 14B may control the switches therein in order to switch between the first mode of operation and the second mode of operation.

Figure 3:
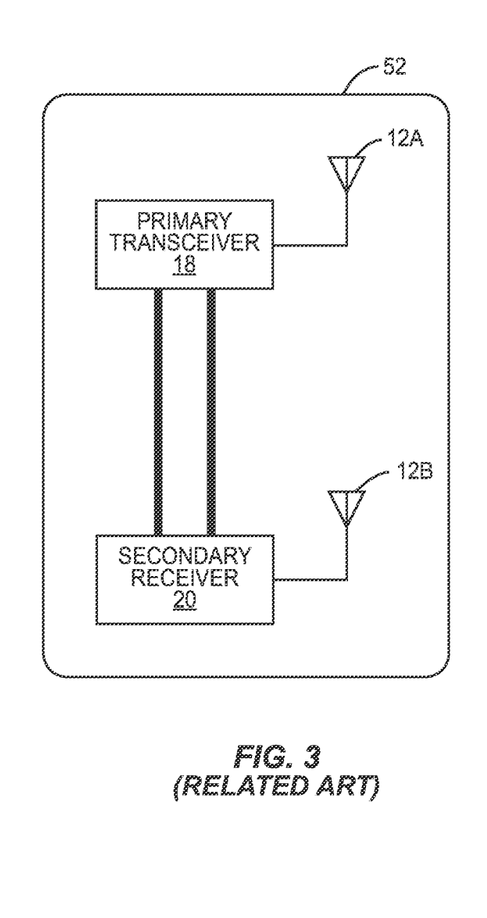
FIG. 3 is a diagram illustrating conventional mobile communications circuitry.

Generally, the primary antenna 12A is provided at a first end of a mobile communications device, and the secondary antenna 12B is provided at a second end of the mobile communications device, which is opposite the first end. This is so that an obstruction (e.g., a user's hand, a surface on which the device is placed, etc.) at one end of a mobile communications device will not affect transmission and/or reception characteristics of both antennas 12 simultaneously, thereby preserving the performance of at least one of the antennas 12. FIG. 3 illustrates a mobile communications device 52 including the first antenna 12A, the second antenna 12B, the primary transceiver circuitry 18, and the secondary receiver circuitry 20. The primary antenna 12A is designed and placed in the mobile communications device 52 in order to be used for the primary transmission and reception of RF signals during normal operation. It is only when an obstruction of some kind limits the performance of the primary antenna 12A that the second mode of operation is used. Accordingly, the primary antenna 12A is used most of the time for the primary transmission and reception of RF signals, while the secondary antenna 12B is used most of the time for the reception of secondary RF signals. The conventional RF front end circuitry 10 is therefore designed to maximize performance during normal operation (i.e., the first mode of operation discussed above).

In order to maximize the performance of the conventional RF front end circuitry 10 in the first mode of operation, the distance between the primary antenna 12A and the primary transceiver circuitry 18 should be minimized. Similarly, the distance between the secondary antenna 12B and the secondary receiver circuitry 20 should be minimized. This is so that signals provided between the primary antenna 12A and the primary transceiver circuitry 18 and the secondary antenna 12B and the secondary receiver circuitry 20 experience minimal insertion loss and distortion that may be introduced by longer signal traces. Since the primary transceiver circuitry 18 and the secondary receiver circuitry 20 are on opposite ends of the mobile communications device 52 in such a configuration, the first cross-coupling connection line 16A and the second cross-coupling connection line 16B run the length of the mobile communications device 52 between the primary antenna switching circuitry 14A and the secondary antenna switching circuitry 14B to implement the antenna swapping capability discussed above. Generally, the first cross-coupling connection line 16A and the second cross-coupling connection line 16B are shielded lines (e.g., coaxial lines) in order to minimize insertion loss and interference. Because the second mode of operation is only temporarily used when the primary antenna 12A experiences a significant decline in performance, the decrease in performance due to the use of the cross-coupling connection lines 16 is considered an acceptable trade-off in order to increase the performance of the conventional RF front end circuitry 10 during normal operation.

In some situations, primary RF transmit signals provided at one of the antennas 12 may couple into the other one of the antennas 12, such that the secondary RF receive signals provided to the secondary receiver circuitry 20 include a portion of the primary RF transmit signals. Filtering circuitry may be provided between the secondary receiver circuitry 20 and the secondary antenna switching circuitry 14B to reduce the portion of the primary RF transmit signals coupled into the secondary receiver path, however, limits on insertion loss in the secondary receiver path may place design constraints on the filtering circuitry that limit the effectiveness thereof. Accordingly, there is a need for RF front end circuitry with improved primary RF transmit signal isolation in the secondary receive signal path.

SUMMARY

The present disclosure relates to radio frequency (RF) front end circuitry, and specifically to RF front end circuitry configured to improve primary RF transmit signal isolation in a secondary receiver signal path. In one embodiment, RF front end circuitry includes primary antenna switching circuitry coupled to a primary antenna node, secondary antenna switching circuitry coupled to a secondary antenna node, a first cross-coupling connection line and a second cross-coupling connection line coupled between the primary antenna switching circuitry and the second antenna switching circuitry, primary transceiver circuitry coupled to the primary antenna switching circuitry, secondary receiver circuitry coupled to the secondary antenna switching circuitry, and switching control circuitry coupled to the primary antenna switching circuitry and the secondary antenna switching circuitry. The switching control circuitry is configured to operate the primary antenna switching circuitry and the second antenna switching circuitry such that in a first mode of operation, the primary transceiver circuitry is coupled to the primary antenna node, the secondary receiver circuitry is coupled to the secondary antenna node, and a portion of a primary RF transmit signal provided from the primary transceiver circuitry is provided to the secondary receiver circuitry via the first cross-coupling connection line. In a second mode of operation, the primary transceiver circuitry is coupled to the secondary antenna node via the first cross-coupling connection line, the secondary receiver circuitry is coupled to the primary antenna node via the second cross-coupling connection line, and a portion of the primary RF transmit signal from the primary transceiver circuitry is provided to the secondary receiver circuitry via the first cross-coupling connection line.

Since the first cross-coupling connection line and the second cross-coupling connection line are already provided for antenna swapping, the secondary receiver circuitry can reduce the presence of primary RF transmit signal components in secondary RF receive signals due to antenna-to-antenna coupling of primary RF transmit signals without the addition of connections between the primary antenna switching circuitry and the secondary antenna switching circuitry. Accordingly, the performance of the RF front end circuitry is significantly improved.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 4:
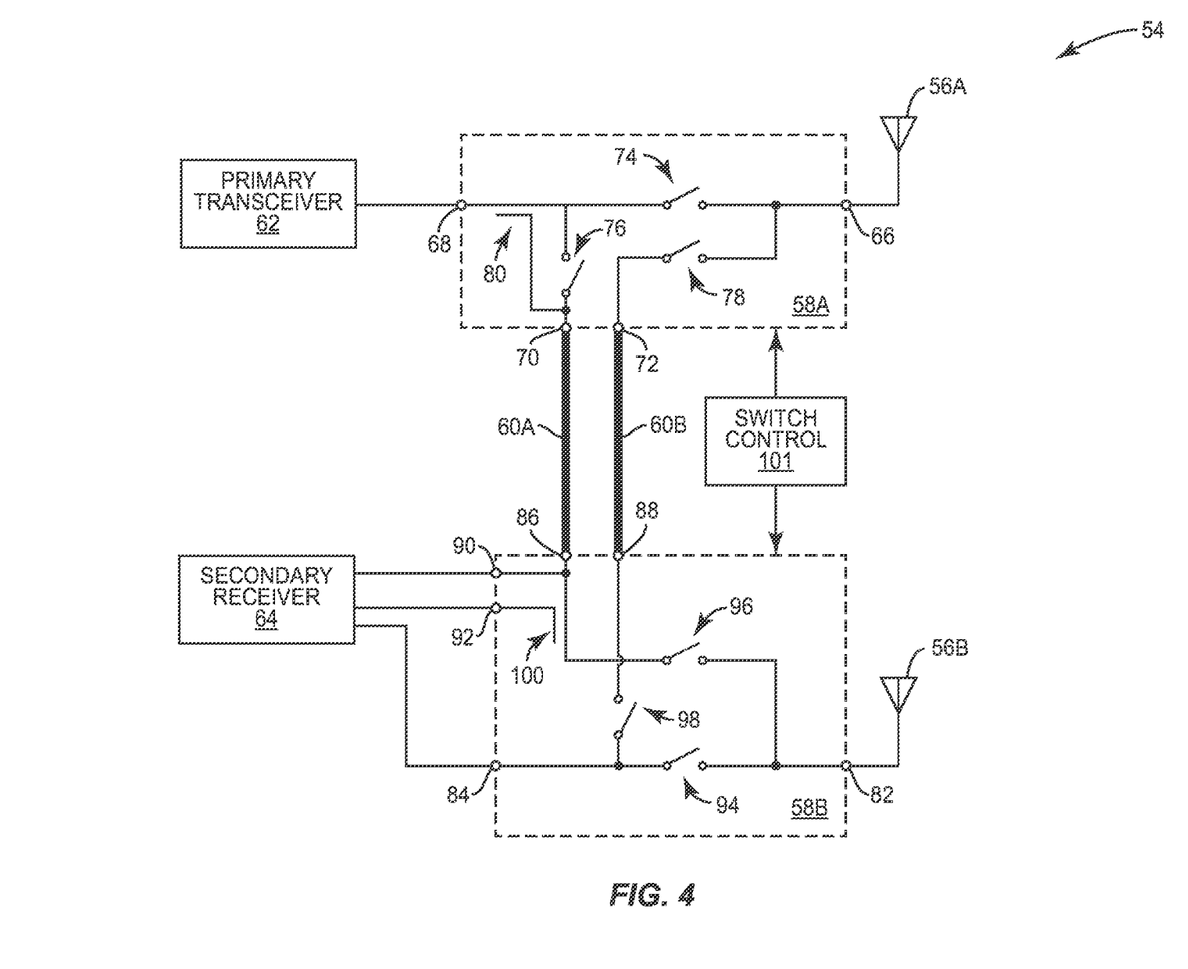
FIG. 4 is a schematic representation of RF front end circuitry according to one embodiment of the present disclosure.

FIG. 4 shows radio frequency (RF) front end circuitry 54 according to one embodiment of the present disclosure. The RF front end circuitry 54 includes a primary antenna 56A, a secondary antenna 56B, primary antenna switching circuitry 58A coupled to the primary antenna 56A, secondary antenna switching circuitry 58B coupled to the secondary antenna 56B, a first cross-coupling connection line 60A and a second cross-coupling connection line 60B coupled between the primary antenna switching circuitry 58A and the secondary antenna switching circuitry 58B, primary transceiver circuitry 62 coupled to the primary antenna switching circuitry 58A and secondary receiver circuitry 64 coupled to the secondary antenna switching circuitry 58B.

The primary antenna switching circuitry 58A includes a primary antenna node 66, a primary transceiver node 68, a first cross-coupling connection node 70 and a second cross-coupling connection node 72. A first switch 74 is coupled between the primary antenna node 66 and the primary transceiver node 68. A second switch 76 is coupled between the primary transceiver node 68 and the first cross-coupling connection node 70. A third switch 78 is coupled between the primary antenna node 66 and the second cross-coupling connection node 72. A primary signal coupler 80 is electromagnetically coupled with a signal line between the primary transceiver node 68 and the first switch 74, and is coupled to the first cross-coupling connection node 70.

The secondary antenna switching circuitry 58B includes a secondary antenna node 82, a secondary receiver node 84, a third cross-coupling connection node 86, a fourth cross-coupling connection node 88, a first feedback signal node 90, and a second feedback signal node 92. A fourth switch 94 is coupled between the secondary antenna node 82 and the secondary receiver node 84. A fifth switch 96 is coupled between the secondary antenna node 82 and the third cross-coupling connection node 86. A sixth switch 98 is coupled between the secondary receiver node 84 and the fourth cross-coupling connection node 88. A first feedback signal path is formed between the third cross-coupling connection node 86 and the first feedback signal node 90. A second feedback signal path is formed by a secondary signal coupler 100, which is electromagnetically coupled with a signal line between the third cross-coupling connection node 86 and the fifth switch 96, and is coupled to the second feedback signal node 92.

Figure 5A:
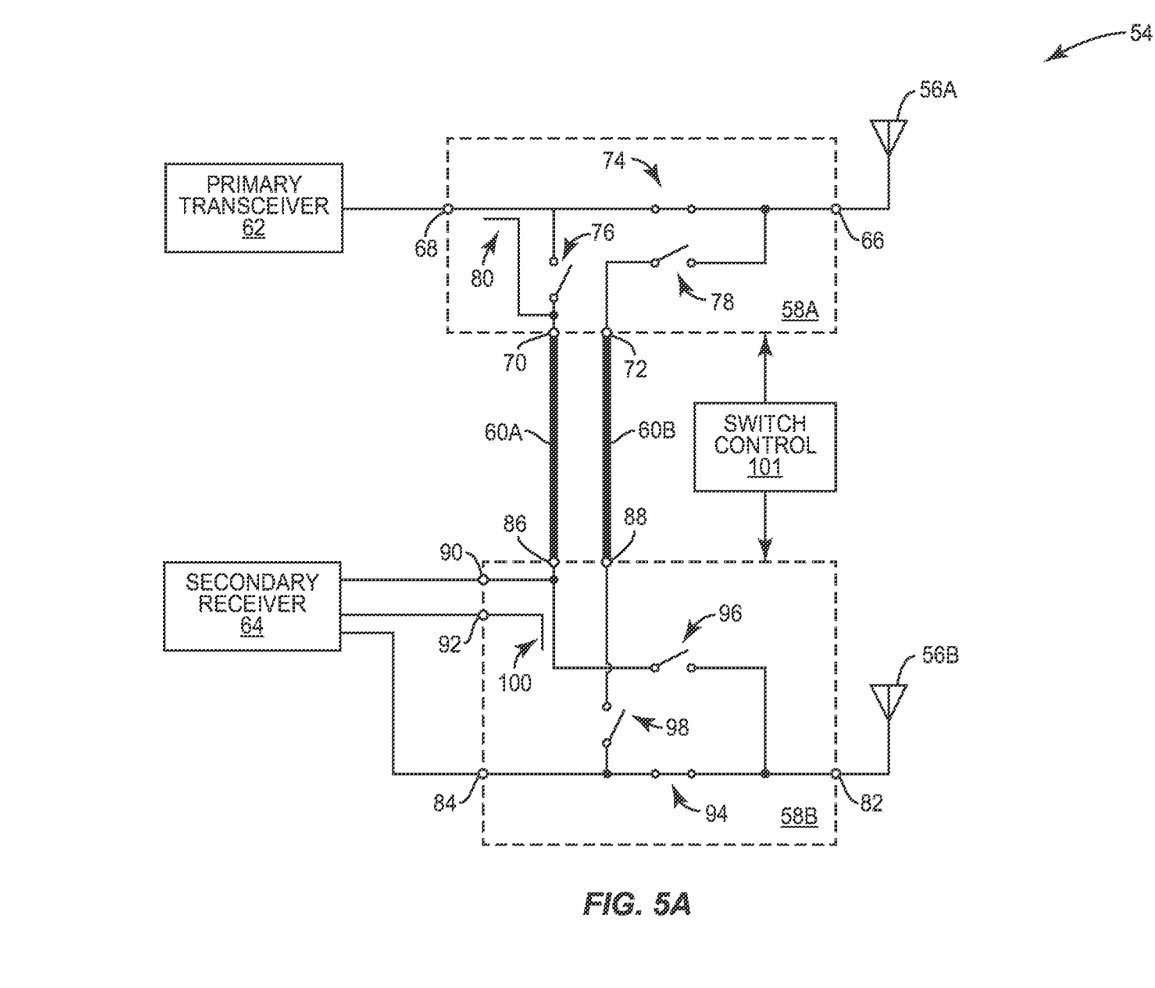
FIGS. 5A and 5B are schematic representations of RF front end circuitry according to various embodiments of the present disclosure.

In a first mode of operation, the first switch 74 and the fourth switch 94 are closed, while the second switch 76, the third switch 78, the fifth switch 96, and the sixth switch 98 are open, thereby coupling the primary transceiver circuitry 62 to the primary antenna 56A and the secondary receiver circuitry 64 to the secondary antenna 56B. This configuration is illustrated in FIG. 5A.

Accordingly, in the first mode of operation, primary RF transmit signals are provided from the primary transceiver circuitry 62 to the primary antenna 56A, primary RF receive signals are provided from the primary antenna 56A to the primary transceiver circuitry 62, and secondary RF receive signals are provided from the secondary antenna 56B to the secondary receiver circuitry 64. The secondary RF receive signals may be diversity multiple-input-multiple-output (MIMO) receive signals. In general, the first mode of operation is used when the performance of the primary antenna 56A is better than that of the secondary antenna 56B, for example, when the voltage standing wave ratio (VSWR) associated with the primary antenna 56A is lower than the VSWR associated with the secondary antenna 56B.

As discussed above, primary RF transmit signals provided by the primary transceiver circuitry 62 may be radiated from the primary antenna 56A and at least partially coupled into the secondary antenna 56B. These relatively high power signals may leak into the secondary receiver signal path, thus degrading the performance of the secondary receiver circuitry 64. Accordingly, at least a portion of the primary RF transmit signals provided from the primary transceiver circuitry are coupled into the primary signal coupler 80 and delivered from the primary antenna switching circuitry 58A to the secondary antenna switching circuitry 58B via the first cross-coupling connection line 60A. The portion of the primary RF transmit signals are then provided to the secondary receiver circuitry 64, where they may be used to reduce the presence of primary RF transmit signals in the secondary RF receive signals attributable to antenna-to-antenna coupling of the primary RF transmit signals. The performance of the RF front end circuitry 54 may therefore be improved.

Using the primary signal coupler 80 to deliver a portion of the RF transmit signals to the secondary receiver circuitry 64 in the first mode of operation allows the RF front end circuitry 54 to implement primary RF transmit signal cancellation without the addition of any additional long-running signal lines between the first antenna switching circuitry 58A and the second antenna switching circuitry 58B. In other words, because the first cross-coupling connection line 60A and the second cross-coupling connection line 60B are already present in order to implement antenna swapping as discussed above, using the first cross-coupling connection line 60A to deliver the portion of the primary RF transmit signals is achieved at a minimal cost from a components perspective (i.e., only requires the addition of the primary signal coupler 80 and the secondary signal coupler 100), and with minimal modification of the RF front end circuitry 54.

Figure 5B:
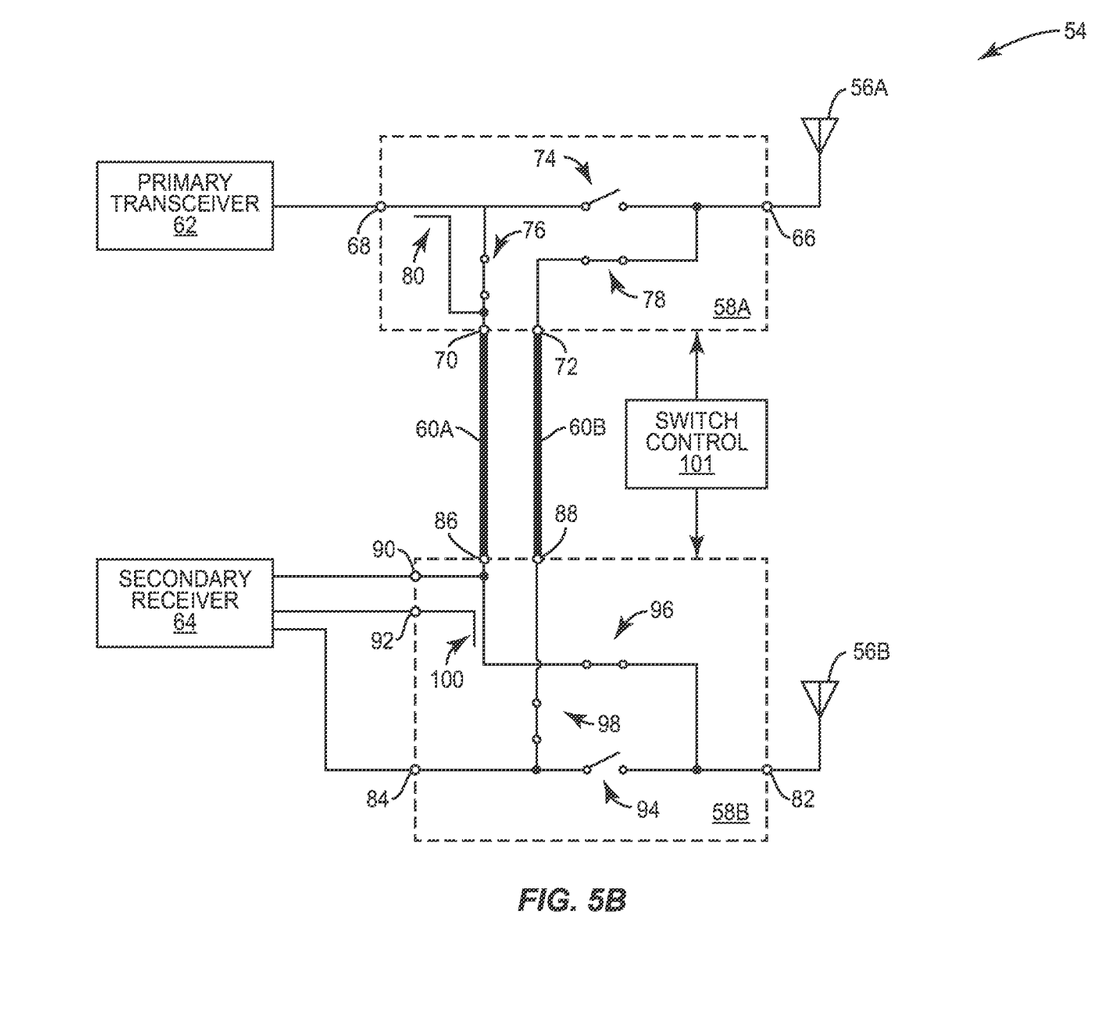

In the second mode of operation, the second switch 76, the third switch 78, the fifth switch 96, and the sixth switch 98 are closed, while the first switch 74 and the fourth switch 94 are open, thereby coupling the primary transceiver circuitry 62 to the secondary antenna 56B and the secondary receiver circuitry 64 to the primary antenna 56A. This configuration is illustrated in FIG. 5B. Specifically, the primary transceiver circuitry 62 is coupled to the secondary antenna 56B via the first cross-coupling connection line 60A, while the secondary receiver circuitry 64 is coupled to the primary antenna 56A via the second cross-coupling connection line 60B. Accordingly, in the second mode of operation, primary RF transmit signals are provided from the primary transceiver circuitry 62 to the secondary antenna 56B, primary RF receive signals are provided from the secondary antenna 56B to the primary transceiver circuitry 62, and secondary RF receive signals are provided from the primary antenna 56A to the secondary receiver circuitry 64. In general, the second mode of operation is used when the performance of the primary antenna 56A is worse than that of the secondary antenna 56B, for example, when the VSWR associated with the primary antenna 56A is higher than the VSWR associated with the secondary antenna 56B.

The secondary signal coupler 100 is used to obtain a portion of the primary RF transmit signals for reducing the portion of primary RF transmit signals in the secondary RF receive signals. Since primary RF transmit signals are already routed into the secondary antenna switching circuitry 58B via the first cross-coupling connection line 60A, the secondary signal coupler 100 couples a portion of these primary RF transmit signals into the secondary receiver circuitry 64, where they are used as described above to reduce the portion of primary RF transmit signals in the secondary RF receive signals attributable to antenna-to-antenna coupling of the primary RF transmit signals. As discussed above, reusing the cross-coupling connection lines 60 to extract a portion of the primary RF transmit signals is achieved with minor modification of the RF front end circuitry 54, and enables a significant increase in the performance thereof. Switch control circuitry 101 coupled to the primary antenna switching circuitry 58A and the secondary antenna switching circuitry 58B may control the switches therein in order to switch between the first mode of operation and the second mode of operation.

While the primary antenna switching circuitry 58A and the secondary antenna switching circuitry 58B are shown in a particular configuration in FIG. 4, the principles of the present disclosure may be accomplished by antenna switching circuitry having many different configurations, all of which are contemplated herein. Further, while the primary transceiver circuitry 62 and the secondary receiver circuitry 64 are shown as single blocks in FIG. 4, the primary transceiver circuitry 62 and the secondary receiver circuitry 64 may include multiple different parts. For example, the primary transceiver circuitry 62 and the secondary receiver circuitry 64 may include separate transmit and/or receive signal paths for ultra high-band RF signals, high-band RF signals, mid-band RF signals, and/or low-band RF signals, and may further include filtering circuitry to combine and/or separate the various signals in these separate signal paths.

The secondary receiver circuitry 64 may use the portion of the primary RF transmit signals to reduce the portion of primary RF transmit signals in the secondary RF receive signals in any number of different ways. For example, the secondary receiver circuitry 64 may adjust a filter response of an adjustable filter based on the portion of the primary RF transmit signals, may provide primary RF transmit signal cancellation in the secondary RF receive signals based on the portion of the primary RF transmit signals, may provide pre-distortion in the secondary RF receive signals based on the portion of the primary RF transmit signals, or the like. As discussed above, in the first mode of operation the portion of the primary RF transmit signals are provided to the secondary receiver circuitry 64 via the first feedback signal node 90, while in the second mode of operation the portion of the primary RF transmit signals are provided to the secondary receiver circuitry 64 via the second feedback signal node 92. Accordingly, in some embodiments a switch (not shown) may be provided in the secondary antenna switching circuitry 58B to isolate the feedback signal path between the third cross-coupling connection node 86 and the first feedback signal node 90 in the second mode of operation. In other embodiments, the secondary receiver circuitry 64 may simply use the signal provided at the first feedback signal node 90 in the first mode of operation and use the signal provided at the second feedback signal node in the second mode of operation.

Figure 6:
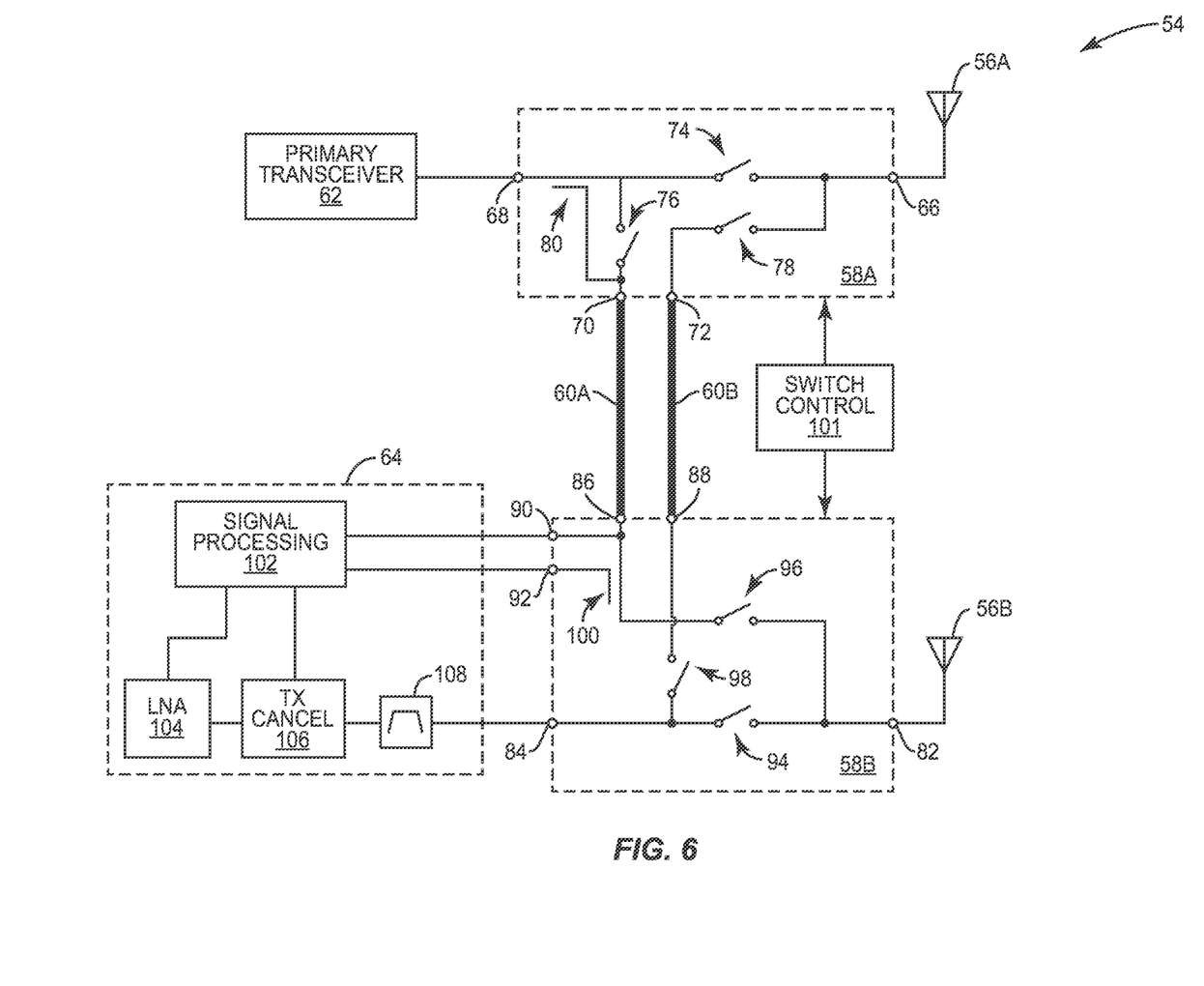
FIG. 6 is a schematic representation of RF front end circuitry according to one embodiment of the present disclosure.

FIG. 6 shows the RF front end circuitry 54 including details of the secondary receiver circuitry 64 according to one embodiment of the present disclosure. As shown in FIG. 6, the secondary receiver circuitry 64 includes signal processing circuitry 102, which is coupled to low-noise amplifier (LNA) circuitry 104, TX cancellation circuitry 106, and optional filtering circuitry 108. The signal processing circuitry 102 is coupled to the first feedback signal node 90 and the second feedback signal node 92 of the secondary antenna switching circuitry 58B. The TX cancellation circuitry 106 is coupled to the secondary receiver node 84 of the secondary antenna switching circuitry 58B via the optional filtering circuitry 108. The LNA circuitry 104 may receive the secondary RF receive signals from the secondary receiver node 84 via the TX cancellation circuitry 106 and optional filtering circuitry 108 and amplify the secondary RF receive signals for further processing. The signal processing circuitry 102 may be configured to receive the portion of the primary RF transmit signals from the first feedback signal node 90 or the second feedback signal node 92, depending upon the mode of operation of the RF front end circuitry 54, and may generate a control signal for one or both of the TX cancellation circuitry 106 and the LNA circuitry 104 based on the portion of the primary RF transmit signals. The control signal(s) may be configured to reduce (e.g., cancel) the component of the secondary RF receive signals attributable to primary RF transmit signals from the primary transceiver circuitry 62 that are coupled into the secondary receiver path via antenna-to-antenna coupling. In some embodiments, the TX cancellation circuitry 106 and/or the optional filtering circuitry 108 is not provided, such that the LNA circuitry 104 is directly connected to the secondary receiver node 84 of the secondary antenna switching circuitry 58B.

The TX cancellation circuitry 106 may reduce the portion of the secondary RF receive signals attributable to coupled primary RF transmit signals in any number of ways known in the art. For example, the TX cancellation circuitry 106 may use the portion of the primary RF transmit signals received at the signal processing circuitry 102 to add an inverted version of the primary RF transmit signals into the secondary RF receive signals in order to cancel that portion of the signals out. Those of ordinary skill in the art will appreciate that any number of different ways to reduce the portion of primary RF transmit signals in the secondary RF receive signals exist, all of which are contemplated herein. In some embodiments, the signal processing circuitry 102 may be omitted such that the TX cancellation circuitry 106 responds directly to the signals provided at the first feedback signal node 90 and the second feedback signal node 92.

Figure 7:
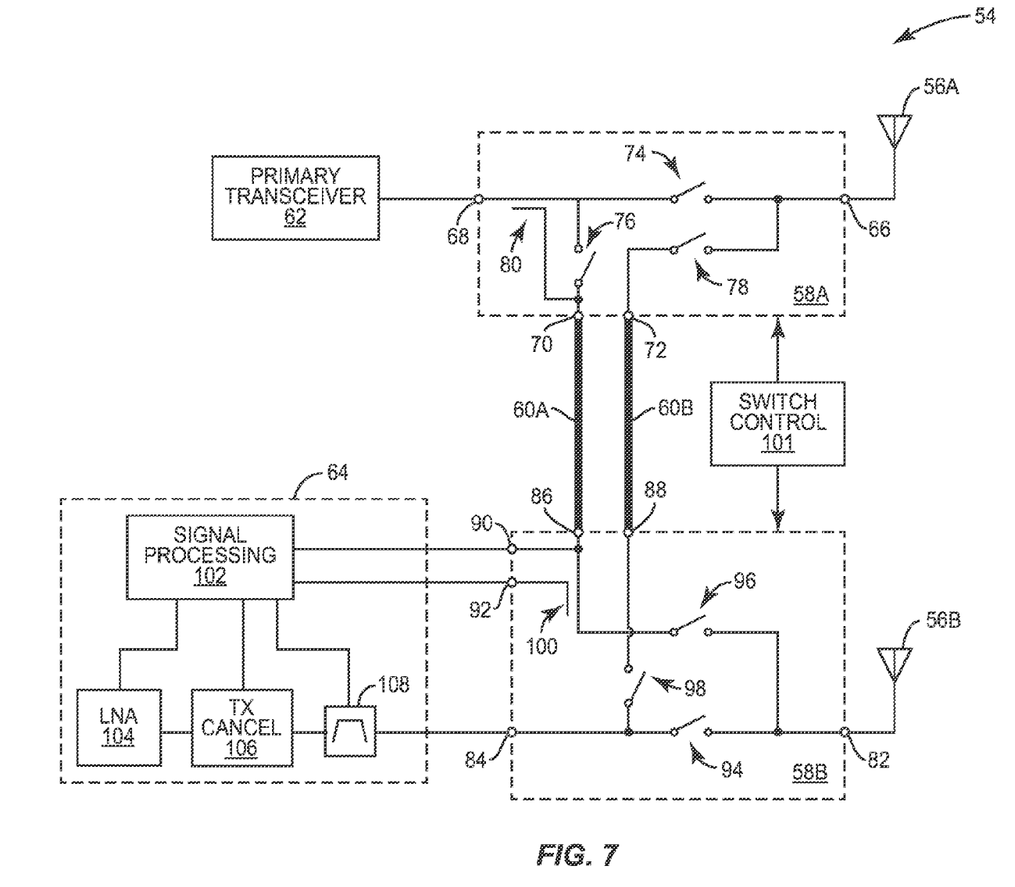
FIG. 7 is a schematic representation of RF front end circuitry according to one embodiment of the present disclosure.

FIG. 7 shows the RF front end circuitry 54 including further details of the secondary receiver circuitry 64 according to an additional embodiment of the present disclosure. As shown in FIG. 7, the optional filtering circuitry 108 is additionally coupled to the signal processing circuitry 102, such that the signal processing circuitry 102 is coupled to the LNA circuitry 104, the TX cancellation circuitry 106, and the optional filtering circuitry 108. The LNA circuitry 104 may receive the secondary RF receive signal from the secondary receiver node 84 of the secondary antenna switching circuitry 58B via the optional filtering circuitry 108 and amplify the secondary RF receive signals for further processing. The signal processing circuitry 102 may be configured to receive the portion of the primary RF transmit signal from the first feedback signal node 90 or the second feedback signal node 92, depending upon the mode of operation of the RF front end circuitry 54, and may generate a control signal for one or more of the optional filtering circuitry 108, the TX cancellation circuitry 106, and the LNA circuitry 104 based on the portion of the primary RF transmit signals. The control signal(s) may be configured to reduce the component of the secondary RF receive signals attributable to primary RF transmit signals from the primary transceiver circuitry 62 that are coupled into the secondary receiver path via antenna-to-antenna coupling. In some embodiments, the TX cancellation circuitry 106 and/or the optional filtering circuitry 108 are not provided, such that the LNA circuitry 104 is directly connected to the secondary receiver node 84 of the secondary antenna switching circuitry 58B.

The optional filtering circuitry 108 may be a band-pass filter with edges that are adjustable based on the control signals provided by the signal processing circuitry 102. In some embodiments, however, the signal processing circuitry 102 may be omitted such that the optional filtering circuitry 108 responds directly to the signals provided at the first feedback signal node 90 and the second feedback signal node 92. By adjusting the optional filtering circuitry 108 based on the portion of the primary RF transmit signals at one of the first feedback signal node 90 and the second feedback signal node 92, the portion of primary RF transmit signals in the secondary RF receive signals attributable to antenna-to-antenna coupling may be significantly reduced. Those skilled in the art will appreciate that many different designs and configurations for the optional filtering circuitry 108 and the signal processing circuitry 102 exist, all of which are contemplated herein.

Figure 8:
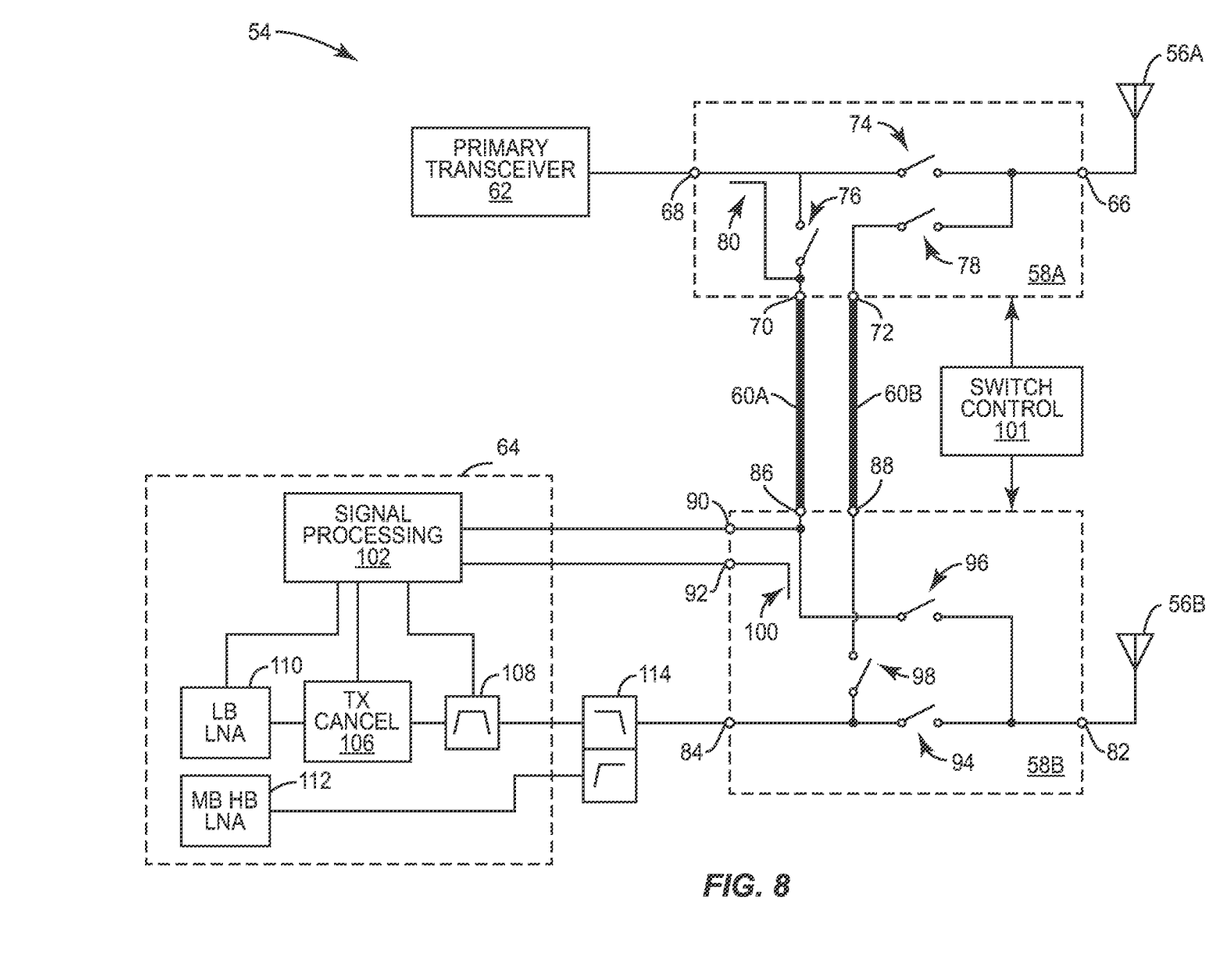
FIG. 8 is a schematic representation of RF front end circuitry according to one embodiment of the present disclosure.

As discussed above, in some embodiments, the primary transceiver circuitry 62, the secondary receiver circuitry 64, or both, may include separate transmit and/or receive paths for ultra high-band signals, high-band signals, mid-band signals, and low-band signals. Accordingly, FIG. 8 shows the RF front end circuitry 54 wherein the secondary receiver circuitry 64 includes a separate signal path for low-band signals and mid/high-band signals. The RF front end circuitry 54 shown in FIG. 8 is substantially similar to that shown in FIG. 7, except that the LNA circuitry 104 is separated into low-band LNA circuitry 110 and mid/high-band LNA circuitry 112, and a diplexer 114 is provided between the secondary receiver node 84 of the secondary antenna switching circuitry 58B and the secondary receiver circuitry 64 in order to separate low-band secondary RF receive signals from mid/high-band secondary RF receive signals and separately deliver the signals to the low-band LNA circuitry 110 and the mid/high-band LNA circuitry 112, respectively. While the optional filtering circuitry 108 is shown coupled only in the signal path of the low-band LNA circuitry 110, additional adjustable filtering circuitry (not shown) may be provided in the signal path of the mid/high-band LNA circuitry 112 without departing from the principles of the present disclosure. Further, the separate signal paths shown in FIG. 8 may be equally applied to any of the other embodiment discussed in the present disclosure.

In one embodiment, the filter response of the diplexer 114 may reduce the level of the primary RF transmit signals in the secondary RF receive signals from around 23 dB to 13 dB (i.e., the diplexer 114 may provide about a 13 dB reduction due to the filtering response thereof). Due to the stringent requirements of many wireless communications standards, such a level of primary RF transmit signal components may be unacceptable. The optional filtering circuitry 108 may further reduce the level of the primary RF transmit signals by about 8 dB (to about 5 dB), and the TX cancellation circuitry 106 may further reduce the level of the primary RF transmit signals by about 12 db (to about −7 dB). Accordingly, the level of the primary RF transmit signals due to antenna-to-antenna coupling in the secondary RF receive signals may be significantly reduced (e.g., reduced by about 8 dB to about 20 dB) when using the principles described in the present disclosure.

Those skilled in the art will recognize improvements and modifications to the embodiments of the present disclosure.

All such improvements and modifications are considered within the scope of the concepts disclosed herein and the claims that follow.

What is claimed is:

1. Radio frequency (RF) front end circuitry comprising:
primary antenna switching circuitry coupled to a primary antenna node;
secondary antenna switching circuitry coupled to a secondary antenna node;
a first cross-coupling connection line and a second cross-coupling connection line coupled between the primary antenna switching circuitry and the secondary antenna switching circuitry;
primary transceiver circuitry coupled to the primary antenna switching circuitry;
secondary receiver circuitry coupled to the secondary antenna switching circuitry; and
switching control circuitry configured to operate the primary antenna switching circuitry and the secondary antenna switching circuitry such that:
in a first mode of operation, the primary transceiver circuitry is coupled to the primary antenna node, the secondary receiver circuitry is coupled to the secondary antenna node, and a portion of a primary RF transmit signal provided from the primary transceiver circuitry is provided to the secondary receiver circuitry via the first cross-coupling connection line; and
in a second mode of operation, the primary transceiver circuitry is coupled to the secondary antenna node via the first cross-coupling connection line, the secondary receiver circuitry is coupled to the primary antenna node via the second cross-coupling connection line, and a portion of a primary RF transmit signal provided from the primary transceiver circuitry is provided to the secondary receiver circuitry via the first cross-coupling connection line.

2. The RF front end circuitry of claim 1 wherein:
the primary transceiver circuitry is configured to provide primary RF transmit signals to the primary antenna switching circuitry and receive primary RF receive signals from the primary antenna switching circuitry; and
the secondary receiver circuitry is configured to receive secondary RF receive signals from the secondary antenna switching circuitry.

3. The RF front end circuitry of claim 2 wherein the secondary receiver circuitry is configured to cancel at least a portion of the primary RF transmit signals in the secondary RF receive signals due to antenna-to-antenna coupling based on the portion of the primary RF transmit signal.

4. The RF front end circuitry of claim 3 wherein:
in the first mode of operation, the portion of the primary RF transmit signal from the first transceiver circuitry is provided via a signal coupler in the primary antenna switching circuitry; and
in the second mode of operation, the portion of the primary RF transmit signal from the first transceiver circuitry is provided via a signal coupler in the secondary antenna switching circuitry.

5. The RF front end circuitry of claim 4 wherein the first cross-coupling connection line and the second cross-coupling connection line are shielded lines.

6. The RF front end circuitry of claim 5 wherein the first cross-coupling connection line and the second cross-coupling connection line are coaxial lines.

7. The RF front end circuitry of claim 4 further comprising a first antenna coupled to the primary antenna node, and a second antenna coupled to the secondary antenna node.

8. The RF front end circuitry of claim 7 wherein the first antenna and the primary transceiver circuitry are provided near a first end of a mobile communications device, and the second antenna and the secondary receiver circuitry are provided near a second end of the mobile communications device, which is opposite the first end.

9. The RF front end circuitry of claim 4 wherein the secondary RF receive signals are diversity multiple-input-multiple-output (MIMO) signals.

10. The RF front end circuitry of claim 3 wherein the first cross-coupling connection line and the second cross-coupling connection line are shielded lines.

11. The RF front end circuitry of claim 10 wherein the first cross-coupling connection line and the second cross-coupling connection line are coaxial lines.

12. The RF front end circuitry of claim 3 further comprising a primary antenna coupled to the primary antenna node, and a secondary antenna coupled to the secondary antenna node.

13. The RF front end circuitry of claim 12 wherein the primary antenna and the primary transceiver circuitry are provided near a first end of a mobile communications device, and the secondary antenna and the secondary receiver circuitry are provided near a second end of the mobile communications device, which is opposite the first end.

14. The RF front end circuitry of claim 3 wherein the secondary RF receive signals are diversity multiple-input-multiple-output (MIMO) signals.

15. The RF front end circuitry of claim 2 wherein the secondary RF receive signals are diversity multiple-input-multiple-output (MIMO) signals.

16. The RF front end circuitry of claim 1 wherein:
in the first mode of operation, the portion of the primary RF transmit signal from the first transceiver circuitry is provided via a signal coupler in the primary antenna switching circuitry; and
in the second mode of operation, the portion of the primary RF transmit signal from the first transceiver circuitry is provided via a signal coupler in the secondary antenna switching circuitry.

17. The RF front end circuitry of claim 16 wherein the first cross-coupling connection line and the second cross-coupling connection line are shielded lines.

18. The RF front end circuitry of claim 17 wherein the first cross-coupling connection line and the second cross-coupling connection line are coaxial lines.

19. The RF front end circuitry of claim 16 further comprising a primary antenna coupled to the primary antenna node, and a secondary antenna coupled to the secondary antenna node.

20. The RF front end circuitry of claim 19 wherein the primary antenna and the primary transceiver circuitry are provided near a first end of a mobile communications device, and the secondary antenna and the secondary receiver circuitry are provided near a second end of the mobile communications device, which is opposite the first end.

* * * * *